Figure 1:
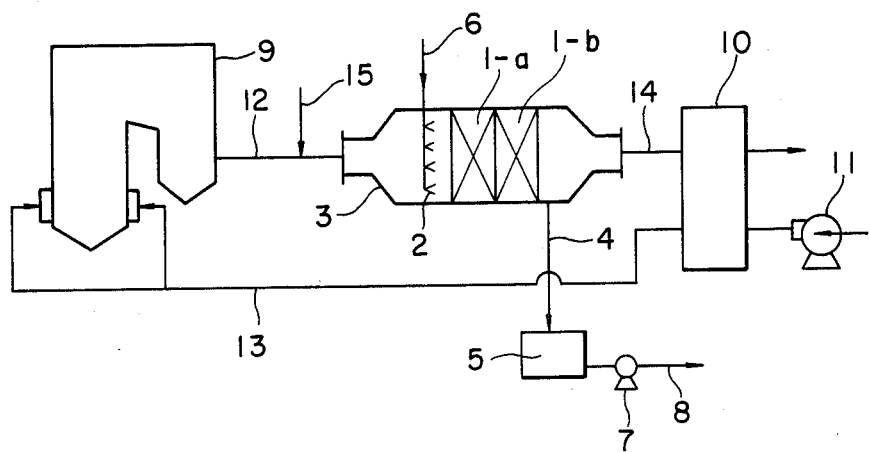

United States Patent [19]

Hino et al.

[11] Patent Number: 4,572,903
[45] Date of Patent: Feb. 25, 1986

[54] METHOD FOR REACTIVATING CATALYSTS USED FOR REMOVING NITROGEN OXIDES WITH STEAM

[75] Inventors: Masao Hino; Mitsuyasu Honda; Toru Seto, all of Hiroshima, Japan

[73] Assignee: Mitsubishi Jukogyo Kabushiki Kaisha, Tokyo, Japan

[21] Appl. No.: 644,534

[22] Filed: Aug. 27, 1984

[30] Foreign Application Priority Data

Aug. 25, 1983 [JP] Japan .................. 58-154207

[51] Int. Cl.$^4$ .............. B01J 23/94; B01J 23/92; B01J 21/20; B01D 53/36
[52] U.S. Cl. .............................. 502/55; 55/96; 423/239; 502/21; 502/515
[58] Field of Search ............... 502/21, 55, 515, 517, 502/518; 423/239 A, 239; 55/96

[56] References Cited

U.S. PATENT DOCUMENTS

| | | |
|---|---|---|
| 4,142,989 | 3/1979 | Kohama et al. ............... 502/21 |
| 4,420,313 | 12/1983 | Hada et al. ............... 423/239 |

FOREIGN PATENT DOCUMENTS

| | | | |
|---|---|---|---|
| 27091 | 3/1977 | Japan ............... | 502/515 |
| 37066 | 3/1979 | Japan ............... | 502/21 |
| 136645 | 10/1981 | Japan ............... | 502/55 |

*Primary Examiner*—P. E. Konopka
*Attorney, Agent, or Firm*—Toren, McGeady, Stanger, Goldberg & Kiel

[57] ABSTRACT

A method for reactivating catalysts which comprises the steps of:
  jetting dry steam into a reactor which is charged with the catalysts deteriorated in performance, in order to remove dust adhering to and accumulating on the surfaces of the catalysts;
  spraying wet steam of 0.4 or less in wetness thereinto to elute and remove water-soluble poisonous materials accumulated inside the catalysts; and
  drying the catalysts with the dry steam.

1 Claim, 2 Drawing Figures

METHOD FOR REACTIVATING CATALYSTS USED FOR REMOVING NITROGEN OXIDES WITH STEAM

The present invention relates to a method for reactivating catalysts so as to recover performance of the catalysts without taking them out of a reactor such as a gas treating device, when the catalysts with which the reactor is charged are deteriorated in performance due to adhesion and accumulation of dust or deposition of poisonous materials.

Particularly, the present invention is suitable for the reactivation of the catalysts which have been applied to a denitration reaction for rendering, harmless, nitrogen oxides in an exhaust gas resulting from combustion of coal or petroleum, by reduction when the gas is caused to pass through the catalysts, or other reactions for oxidizing or burning carbon monoxide or hydrocarbons by the use of the catalysts.

Generally, in treating a dirty gas including the dust and SOx such as an exhaust gas from a heavy oil-fired boiler or a coal-fired boiler, the constitution of the catalysts must be most properly selected taking, into consideration, SOx resistance, poisonous dust resistance, dust clogging resistance and dust wear resistance. Heretofore, the catalysts in which active components such as $V_2O_5$, $WO_3$, $Fe_2O_3$ and $MoO_3$ are carried on $TiO_2$ have been employed, because the SOx resistance can be sufficiently satisfied by using the $TiO_2$ as a carrier in place of $Al_2O_3$ which is often utilized to treat an exhaust gas from an LNG-fired boiler or the like. As catalyst systems having the dust clogging resistance, there are a system in which the catalysts shaped into particles, columns or ellipsoids are used in a moving bed, and another system in which a fixed bed is made of plate-, pipe-, lattice- or honeycomb-shaped catalyst structure and the exhaust gas is caused to pass therethrough in a parallel stream. And these systems are now compared with each other and studied. In recent years, the lattice-shaped catalyst structure is main, because of being economical and being simple in maintenance.

However, if even the parallel stream lattice-shaped catalyst structure including the $TiO_2$ as the carrier is used for a long period of time, its catalytic activity will deteriorate, because of deposited alkali metals and alkaline earth metals such as Na, K and Ca in the dust. It is economically disadvantageous to throw away the catalysts having no activity after the catalytic activity has been lost once, therefore an effective method for the reactivation of the catalysts is presently required.

Many methods for the reactivation of the catalysts have already been suggested. One of them is a method for reactivating the catalysts on the basis of a steam jetting process (see Japanese Patent Provisional Publication No. 27091/1977), which method comprises dipping the deteriorated catalysts into water or a diluted aqueous inorganic acid solution at ordinary temperature or an elevated temperature in order to clean them, alternatively directly blowing water vapor at the catalysts.

However, such a manner of merely blowing water vapor involves the following drawbacks:

That is to say, the dust contains alkali components such as K, Na and the like, in an amount of several percent to several tens percent, which are poisonous to the catalysts. Accordingly, if wet steam or saturated steam is directly blown without removing the dust, a drain will be produced in which the alkali components in the dust are dissolved. As a result, the alkali components will adversely be accumulated in the catalysts, which fact will lead to the deterioration of their activity. Further, if a plant begins to run when the catalysts remain wet, the dust in the exhaust gas will adhere to the wet catalysts, and thus the reactivated catalysts will deteriorate in performance again.

The present invention contemplates providing a method for reactivating the catalysts without involving the above-mentioned drawbacks, and which method comprises the steps of jetting dry steam into a reactor which is charged with the catalysts deteriorated in performance, in order to remove dust adhering to and accumulating on the surfaces of the catalysts; spraying wet steam of 0.4 or less in wetness thereinto to elute and remove water-soluble poisonous materials accumulated inside the catalysts; and drying the catalysts with the dry steam.

According to the present invention, an amount of a waste liquid to be treated is advantageously smaller than in the case of a water washing manner such as a conventional dipping process or spray process, and a jetting pressure of the steam in the present invention can also conveniently be utilized even in a reactor such as a horizontal reactor to which the spray water washing process is relatively difficult to be applied (because waterdrops do not reach the downstream portions of the catalysts).

Incidentally, when in the total steam of 1 kg, an amount of a gas is x kg and an amount of liquid droplets is $(1-x)$ kg, a value of $(1-x)$ is called a wetness. Therefore, the wet steam having a wetness of 0.4 or less in the present invention means the steam of the $(1-x)$ value being 0.4 to 0. Further, the dry steam in the present invention means the pure steam not including any water droplets.

Figure 2:
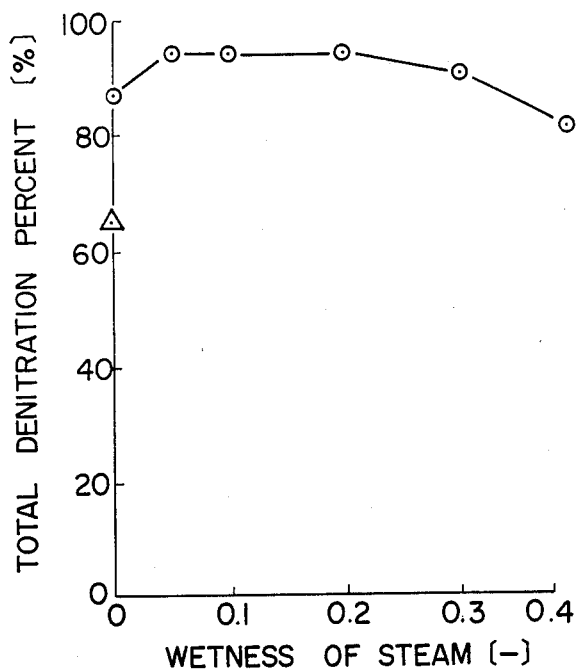

These objects, characteristics and benefits of the present invention will be definite from the following description and the accompanying drawings in which:

FIG. 1 is a schematic view illustrating one embodiment of a method according to the present invention; and FIG. 2 is a graph illustrating a relation between a wetness of steam and a total denitration percent on the basis of the practice of the present invention.

In reference to the attached drawings, a method of the present invention will be described as one embodiment.

FIG. 1 is a view illustrating the embodiment in which the method of the present invention is applied to a denitration device for an exhaust gas from a heavy oil-fired boiler. In the case that a usual run is made, an exhaust gas in a boiler 9 is introduced into a denitration reactor 3 through a line 12, and nitrogen oxides in the exhaust gas are reacted with an ammonia gas as a reducing agent fed through a line 15 in denitration catalytic layers 1-a, 1-b in order to decompose the nitrogen oxides into harmless nitrogen and water. The exhaust gas which has undergone the denitration is forwarded to a downstream air heater 10 through a line 14 and is heat exchanged here, and it is then delivered to a further downstream process. Air necessary for the combustion in the boiler 9 is fed in the state of heated air through an air feed line 13 after driving a ventilating blower 11 and carrying out a heat exchange in the air heater 10.

When during running, the performance of catalysts deteriorates owing to a certain cause, for example, an accumulation of catalyst poisons such as alkali metals or alkaline metals in the exhaust gas, dry steam is fed to the denitration reactor 3 through a steam feed line 6 and is sprayed through steam jetting nozzles 2 in order to remove dust adhering to and depositing on the catalysts and frames of the catalysts.

After the removal of the dust, the flow of the treating gas into the denitration catalytic layers 1-a, 1-b is stopped, and a reactivation of the catalysts is carried out. That is to say, the steam fed through the steam feed line 6 is switched to wet steam of 0.4 or less in wetness, and the wet steam is then jetted through steam jetting nozzles 2 in order to elute and remove alkali metals and alkaline earth metals accumulated in the catalysts.

This wet steam can be simply prepared by passing the dry steam through water, or by forcedly introducing water into the dry steam under conditions of adjusted pressure and temperature.

A drain produced at the time of this reactivation process is temporarily stored in a drain bin 5 through a drainage line 4 and is then transferred to a waste liquid treating line 8 by means of a pump 7.

Next, in order to dry the reactivated catalysts, the wet steam fed through the line 6 is switched to the dry steam and the latter is sprayed through the steam jetting nozzles 2.

EXAMPLE

A horizontal denitration reactor was charged with denitrating catalysts (150 mm wide×500 mm long; 7 mm pitch; lattice-shaped) in such a distribution that 4 catalysts were present in each of a first layer and a second layer. The catalysts were those which had already been applied to an exhaust gas from a heavy oil-fired boiler for 16000 hours and which had been deteriorated in activity. While an exhaust gas having composition set forth in Table 1 was introduced into the denitration reactor at a temperature of 320° C. at a gas flow rate of 500 Nm³/hr, 5 kg/cm²G of dry steam were jetted through four steam jetting nozzles disposed at an upstream section of the gas in the reactor for 2 minutes in order to remove dust adhering to and accumulating on the catalysts. Each of the jetting nozzles had a taper portion, a nozzle diameter on the inlet side of which was 5 mm$\phi$, and a nozzole diameter on the outlet side of which was 6 mm$\phi$, a divergent ratio of each nozzle being 1.55. These steam jetting nozzles were disposed in the proportion of one to one of the catalysts in the first layer. After the removal of the dust, the introduction of the exhaust gas into the reactor was stopped and the tempearature of the reactor was dropped to ordinary temperature. Afterward, wet steam of 0.1 in wetness was jetted into the reactor through the steam jetting nozzles under a pressure of 5 kg/cm²G for 30 minutes. Afterward, 5 kg/cm²G of dry steam were jetted thereinto for 5 minutes in order to dry the catalysts.

In a like manner, a reactivation test for the catalysts was carried out varying the wetness of the steam.

The used catalysts were sampled and denitration percents thereof were measured under test conditions set forth in Table 2. The results are shown in FIG. 2, in which circular symbols represent total denitration percents of the reactivated catalysts and triangular symbols represent total denitration percents of the deteriorated catalysts, the total denitration percents referred to above being indicative of the denitration percents of the first layer catalysts and the second layer catalysts.

As be definite from FIG. 2, the steam in a suitable wetness range can provide a higher reactivation effect than the steam having a wetness of 0, but when the wetness is inversely too high, the total denitration percent will be low since the rectivation effect of the second layer catalysts are reduced. This reason is that when the wetness is too high in the reactor, waterdrops are stored in pores of the catalysts and the jetting effect of the steam is thus reduced in the second layer. Accordingly, the present invention employs the steam of 0.4 or less in wetness.

As understood from the foregoing, it has been confirmed that the reactivation of the catalysts can be accomplished by jetting the steam even in the horizontal reactor to which the spray water washing method is relatively difficult to be applied.

TABLE 1

| | Composition of the exhaust gas | | | | | |
|---|---|---|---|---|---|---|
| NOx (ppm) | SOx (ppm) | $O_2$ (%) | $CO_2$ (%) | $H_2O$ (%) | Dust (mg/Nm³) | $N_2$ (%) |
| 160-170 | 380-400 | 4.2 | 12 | 10 | 110 | Residue |

TABLE 2

| | | | Conditions of the test | | | | | |
|---|---|---|---|---|---|---|---|---|
| Temperatue (°C.) | AV* value (Nm³/m²h) | Ratio of $NH_3$/NOx (mol ratio) | Composition of the exhaust gas | | | | | |
| | | | NOx (ppm) | SOx (ppm) | $O_2$ (%) | $CO_2$ (%) | $H_2O$ (%) | $N_2$ (%) |
| 380 | 12.5 | 1.0 | 160 to 170 | 380 to 400 | 4.2 | 12 | 10 | Residue |

*AV value: Area velocity

COMPARATIVE EXAMPLE

In the same nammer as in Example 1, a denitration tank was charged with deteriorated catalysts, and steam of 0.1 in wetness was jetted thereinto through steam jetting nozzles at a pressure of 5 kg/cm²G for 30 minutes, without previously removing any dust (an amount of the adhered dust on each of the catalysts was 400 g). Next, 5 kg/cm²G of dry steam were jetted thereinto for 5 minutes to dry the catalysts. A denitration percent by virtue of these catalysts was measured under reactivation test conditions shown in Example 1. The result was 70%.

Further, in the same manner as in Example 1, reactivation of catalysts was carried out by the use of steam having a wetness of 0.1, and an exhaust gas having composition set forth in Table 1 above was caused to pass through a denitration tank which was charged with the catalysts, for 50 hours, without drying the catalysts with dry steam. A denitration was measured under activation test conditions set forth in Table 2 above. The result was 75%.

From the above-mentioned results, it has been found that when the wet steam is jetted without previously removing the dust, alkali components in the dust adhering to the catalysts will be eluted and will thus lower the reactivation efficiency, and that when the exhaust gas including the dust is caused to pass through the denitration catalytic tank which is charged with the catalysts, without drying the catalysts, the dust will adhere to the catalysts in order to lower the reactivation efficiency.

We claim:

1. A method for reactivating catalysts used for removing nitrogen oxides from exhaust gases which comprises the steps of:
   jetting dry steam into a reactor which is charged with said catalysts deteriorated in performance, in order to remove dust adhering to and accumulating on the surfaces of said catalysts;
   spraying wet steam of 0.4 or less in wetness thereinto to elute and remove water-soluble poisonous materials accumulated inside said catalysts; and
   drying said catalysts with said dry steam.

* * * * *